Figure 1:
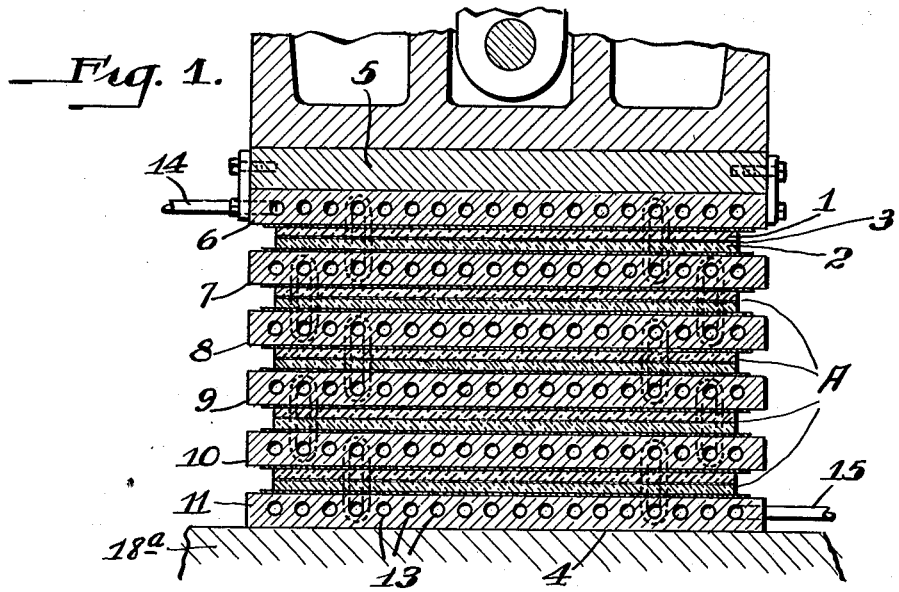

Aug. 9, 1932.   J. H. SHERTS   1,870,693
PROCESS FOR MAKING COMPOSITE GLASS
Filed July 23, 1929

INVENTOR
James H. Sherts
By
James E. Bradley
Atty.

Patented Aug. 9, 1932

1,870,693

UNITED STATES PATENT OFFICE

JAMES H. SHERTS, OF BRACKENRIDGE, PENNSYLVANIA, ASSIGNOR TO DUPLATE CORPORATION, A CORPORATION OF DELAWARE

PROCESS FOR MAKING COMPOSITE GLASS

Application filed July 23, 1929. Serial No. 380,277.

Figure 2:
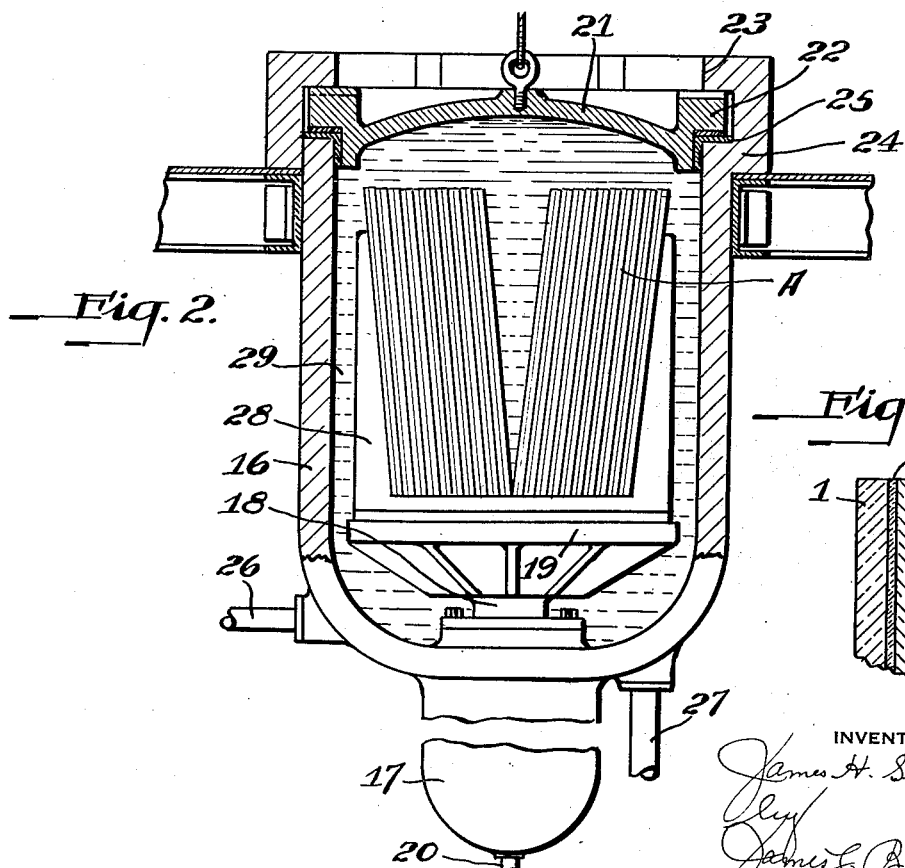

The invention relates to a process for making composite glass and constitutes a modification of the process set forth in the joint patent of Robert E. Hamill and myself No. 1,781,084. Composite glass is ordinarily made of two sheets of glass with an interposed sheet of pyroxylin or other cellulose plastic cemented to the glass by means of gelatin or other suitable cement. Glass of this description is composited under heat and pressure, one well-known method comprising the steps of placing the assembled sheets in a rubber bag and exposing it in a pressure chamber containing water to pressure of about 150 pounds per square inch and a temperature of about 250 degrees F. Glass so composited tends to develop an edge condition in which the pyroxylin is thinned around the edges of the plate and squeezed out, the glass thus being bent slightly at the edges and placed under strain. This is due to the action of the rubber bag where it passes over the edges of the glass sheets. This condition may later result in a separation at the edge of the composite plate due to the tendency of the bent glass to pull away from the plastic. It may also result in the formation of slight cracks or lines in the glass running back from the edge a short distance and referred to as vents. The protruding edge of the pyroxylin plastic also makes the final grinding of the composite plate much more difficult. The process of the Sherts and Hamill patent overcomes the difficulties mentioned above, but involves a preliminary pressing at the same pressure and temperature as the final pressing. The present invention is designed to simplify the process of the Sherts and Hamill patent and cheapen the cost of the opparatus required in the preliminary pressing step by very materially reducing the heat and pressure employed in the first pressing operation. To this end the preliminary pressing step consists in joining the sheets together under relatively light pressure, and at a temperature which is below that normally employed in compositing, the sheets being prepared for this pressing operation in the ordinary way, that is, gelatin or other cement is applied to the inner faces of the glass sheets and allowed to dry, after which the glass sheets are applied to the reinforcing sheet of pyroxylin plastic. The sandwich, as thus formed, is exposed to a pressure, which may run as low as 10 pounds per square inch, but which may run as high as 60 or 80 pounds to advantage, heat being applied preferably in the neighborhood of 200 degrees F. This treatment may occur in a platen press or in a thin rubber container in a bath of hot liquid. This treatment expels the air from between the sheets, cements them firmly together and seals the joints at the edges of the sheets so that in the subsequent pressing operation the liquid in which the sheets are pressed cannot force its way in between the sheets. The plate, as thus composited, is then placed in a pressure tank and exposed to the temperature and pressure conditions normally employed in compositing glass, although the time now required is much less than in the rubber bag operation, due to the fact that no rubber bag is necessary and the insulating effect of such bag is, therefore, avoided. It has also been found that this final pressing operation may be very much more quickly and economically performed by keeping the liquid in the tank hot at all times, that is, by placing the plates to be composited in the liquid while it is at approximately its operating temperature and also removing the plates from the liquid at approximately such operating temperature. In order to proceed in this way, it is necessary to use a liquid having a high boiling point, one preferably used being di ethylene glycol mono ethyl ether, which liquid has a boiling point above the temperature required in the liquid in order to soften the pyroxylin plastic. The use of this liquid also has the further advantage that it is a non-volatile solvent of pyroxylin plastic, and the extreme edges of the plastic sheet are thus saturated so that subsequent shrinkage of such edges due to a loss of solvent and camphor from the plastic will not occur, thus still further reducing the tendency of the edges to separate upon exposure to the atmosphere. One form of apparatus for practicing the process is shown in the accompanying drawing, wherein:

Figure 1 is a section through a platen press which may be employed for carrying out the preliminary pressing step. Fig. 2 is a section through a hydraulic press in which the final pressing operation is conducted. And Fig. 3 is a section through a composited plate A.

Figure 3:
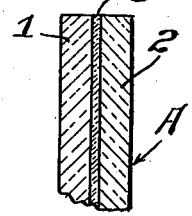

In compositing the plates the sheets are assembled, as indicated in Fig. 3, wherein: 1 and 2 are glass sheets, and 3 is a sheet of cellulose plastic, such as celluloid or cellulose acetate. The glass sheets are coated on their inner faces with gelatin and the sheets are assembled, as indicated in Fig. 3 preliminary to pressing in the platen press shown in Fig. 1. This press is constructed to handle five composite plates at one time, but this number may be varied to suit requirements. As shown the press comprises a base member 4, a head 5 movable toward and from the base and a series of six platens 6, 7, 8, 9, 10, 11 and 12. These platens are heated to a temperature of about 200 degrees F. by circulating steam therethrough from the pipes 14, 15. This pressing action is continued for about five minutes, after which the press is opened and the sets of sheets are removed. This pressing operation expels all of the air from between the sets of sheets and joins them securely together, thus preparing them for the final pressing operation.

The final pressing operation is preferably carried out in an apparatus such as that shown in Fig. 2, such apparatus and the pressing operation being substantially the same as that set forth in the Sherts and Hamill patent. This apparatus comprises a pressure chamber 16 having at its lower end an extension 17 carrying a plunger 18 whose upper end supports a table 19. A pipe 20 connected to the lower end of the extension 17 serves to supply liquid under pressure for raising the plunger. The chamber is closed by means of the cover 21 provided with locking lugs 22. Lying above the locking lugs are opposing lugs 23 carried by the upper end of the chamber 16. The opposing faces of the two sets of lugs are inclined so that when the cover is inserted to the position shown and rotated so as to bring the lugs 22 beneath the lugs 23, the engagement of the cam surfaces forces the cover down tightly against the shoulder 24, a suitable gasket 25 being provided in order to make a tight joint. The chamber is provided with an inlet pipe 26 and an outlet pipe 27 leading to circulating and heating apparatus so that hot liquid may be circulated through the chamber 1.

In loading the apparatus, the cover 21 is removed and the plunger 18 is moved up so that the table 19 lies adjacent the top of the pressure chamber. The rack 28 is then placed on the table carrying the series of sets of plates A which have been preliminarily pressed and removed from the press shown in Fig. 1, as heretofore described. The table 19 is now lowered into the chamber and the cover 21 applied and secured in position. The chamber 1 at this time contains the body of liquid 29 which is to form the heating and pressing medium and such liquid is preferably kept at all times at operating temperature; namely, about 212 degrees F. The liquid preferably employed, as heretofore stated, is ethyl carbitol, which is formed by heating ethyl alcohol and ethylene oxide under pressure in an autoclave until reduced to a mix containing ethyl alcohol, ethylene glycol mono ethyl ether, di ethylene glycol mono ethyl ether and a little glycol. This mixture is stilled to remove the alcohol and cellosolve, leaving only the di ethylene glycol mono ethyl ether and glycol which are then separated. Di ethylene glycol mono ethyl ether has a boiling point above 212 degrees F. so that it does not vaporize appreciably when exposed to the atmosphere at the temperature at which the liquid is used. After the set of plates is lowered into the tank and the cover 21 is secured in position, a pressure of about 150 pounds per square inch is applied to the liquid, such pressure being held for about five minutes or a slightly greater period, after which the pressure is released and the cover 21 removed. The table 5 is now moved upward by the plunger 18 until the rack 28 and its contents are removed from the chamber. The rack may now be moved away and the composite plates drained and sprayed, thus removing any di ethylene glycol mono ethyl ether adhering thereto. This completes the operation and a new set of plates may be placed in the pressure chamber and pressed. A circulation of the di ethylene glycol mono ethyl ether through the chamber 16 is preferably provided for by means of circulating apparatus connected to the pipes 26 and 27 as the liquid is relatively thick and a circulation through the pressure chamber is desirable in order to secure a uniform temperature throughout the chamber and to speed up the heating of the plates by the liquid. Other high boiling liquids, aside from di ethylene glycol mono ethyl ether, may be used, as well as liquids which are not solvents for pyroxylin plastic, but di ethylene glycol mono ethyl ether has been found to be most satisfactory and its use is preferred. As a matter of economy, it is preferred to maintain the di ethylene glycol mono ethyl ether constantly at operating temperature in the neighborhood of 212 degrees F., but this is also not an essential of operation as the plates to be composited may be inserted in the liquid while it is relatively cool and its temperature brought up to the desired point during the application of pressure. The temperature of the liquid may also be reduced preliminary to removing the composited plates, although this involves the loss of heat and the result secured is not as good. The press shown in Fig. 1 is only one of a number of available pieces of apparatus for giving the plates their preliminary pressing operation, all that is necessary being some form of apparatus which will provide enough pressure and heat to make the sheets stick together so that when the plates are finally pressed at high pressure and temperature, the liquid in the pressure chamber will not penetrate between the sheets and thus prevent proper pressing. The particular pressing apparatus shown in Fig. 2 is also in no wise essential to the practice of the invention as any type of pressure chamber may be employed in which the plates may be placed and in which fluid pressure of the desired degree may be applied accompanied by the application of temperature conditions such as to soften the plastic and the cement.

The second pressing operation has been referred to throughout as being carried on in a liquid as a pressing medium, and for obvious reasons a liquid is preferable to a gas, but gases, mixtures of gases, and mixtures of gases and liquids might be employed as a pressing agent without departing from the invention which contemplates the use of any and all fluids. If desired, the liquid may be run at a temperature considerably above the 212 degree F. figure specified, but in that case, the plates should be left in the liquid only a very short period, as a reaction begins in the pyroxylin plastic tending toward decomposition when it is heated above 200 degrees F. While gelatin is the cement referred to for securing the sheets together, it will be understood that the term "cement" is used in its broad sense, and applies to any adhesive used between the pyroxylin plastic sheet and the glass, and even to a cement formed by softening the surface of the pyroxylin plastic by a solvent or plasticizer, such as acetone.

What I claim is:

1. A process of making composite glass, which consists in cementing a pair of glass sheets to the opposite sides of a sheet of tough reinforcing material with the application to the sheets of heat and only sufficient pressure to expel the air from between the surfaces and make them adhere so as to seal the joints at the edges of the sheets, and then submerging the composite plate thus formed in a bath of heated fluid and exposing it to a final compositing pressure greatly in excess of the first pressure, the heated fluid being in direct contact with the surface of the plate.

2. A process of making composite glass, which consists in cementing a pair of glass sheets to the opposite sides of a sheet of cellulose plastic, with the application of heat and a degree of pressure below the final compositing pressure, but sufficient to seal the joints at the edges of the sheets, placing the sheet thus composited in a bath of liquid so that such liquid contacts directly with the surface of the plate and having a relatively high temperature approximating that required to soften the sheet of plastic, applying a final compositing pressure to the liquid greatly in excess of the first pressure and then removing the plate while the liquid is still at said relatively high temperature.

3. A process of making composite glass, which consists in cementing a pair of glass sheets to the opposite sides of a sheet of pyroxylin plastic, with the application of heat and a degree of pressure sufficient to seal the joints at the edges of the sheets, placing the plate thus composited in a bath of liquid which vaporizes only at a relatively high temperature and having a temperature of approximately 212 degrees F., applying a pressure greatly in excess of the first pressure to the liquid and raising the temperature of the liquid, and then removing the plate while the liquid is still at a temperature approximating 212 degrees F., the liquid of the bath during the last pressing operation being in direct contact with the surface of the plate.

4. A process of compositing glass and reinforcing sheets, which consists in cementing together a set of such sheets with the application of heat and pressure which seals the joints at the edges of the sheets and then submerging the composite plate thus formed in a bath of liquid in direct contact therewith throughout, to which heat and a compositing pressure both substantially greater than the first heat and pressure are applied to give a further compositing action.

5. A process of compositing glass and cellulose plastic sheets, which consists in securing the sheets together with the application of heat thereto and under a compositing pressure which seals the joints at the edges of the sheets, and then applying a higher fluid pressure directly to all the surfaces of the plate thus formed to give a further compositing action with the temperature of the fluid at a point such as to soften the plastic sheet.

In testimony whereof, I have hereunto subscribed my name this sixth day of July, 1929.

JAMES H. SHERTS.